Jan. 5, 1932.      H. J. PAYNTER      1,839,495
ELECTRICAL SWITCH FOR LINE CONTROL OF CAN MACHINERY
Filed Sept. 27, 1930    2 Sheets-Sheet 2
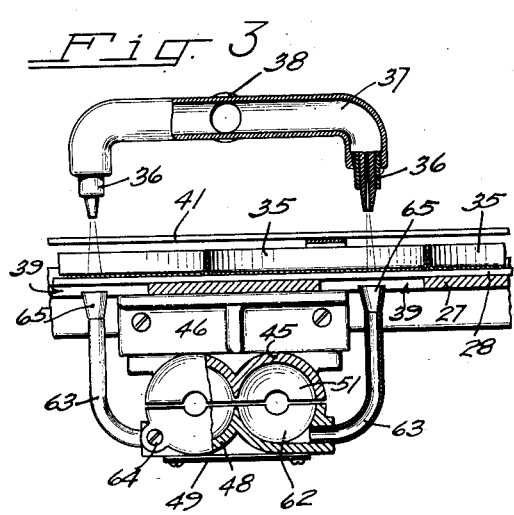
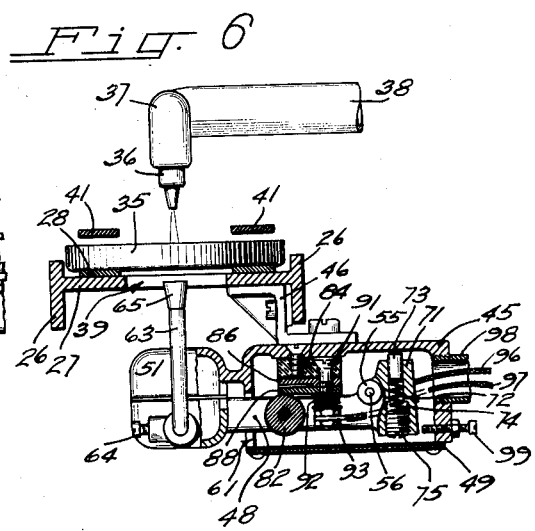
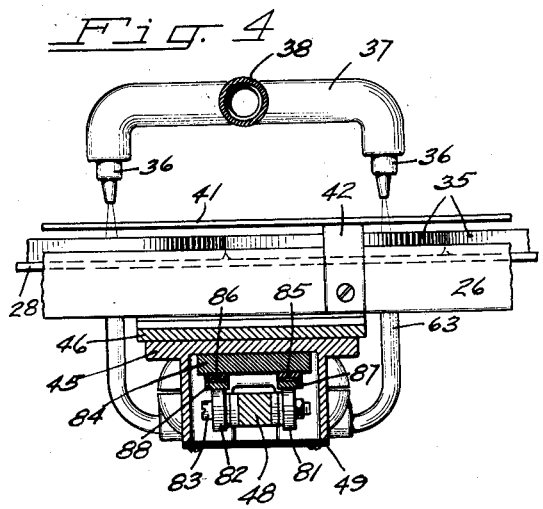
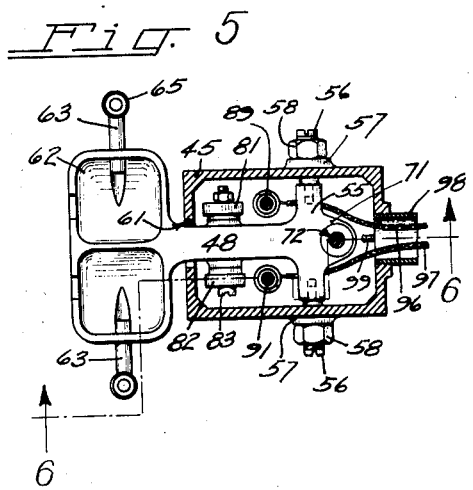
INVENTOR
Horace J. Paynter
BY
John C. Carpenter
ATTORNEY Patented Jan. 5, 1932

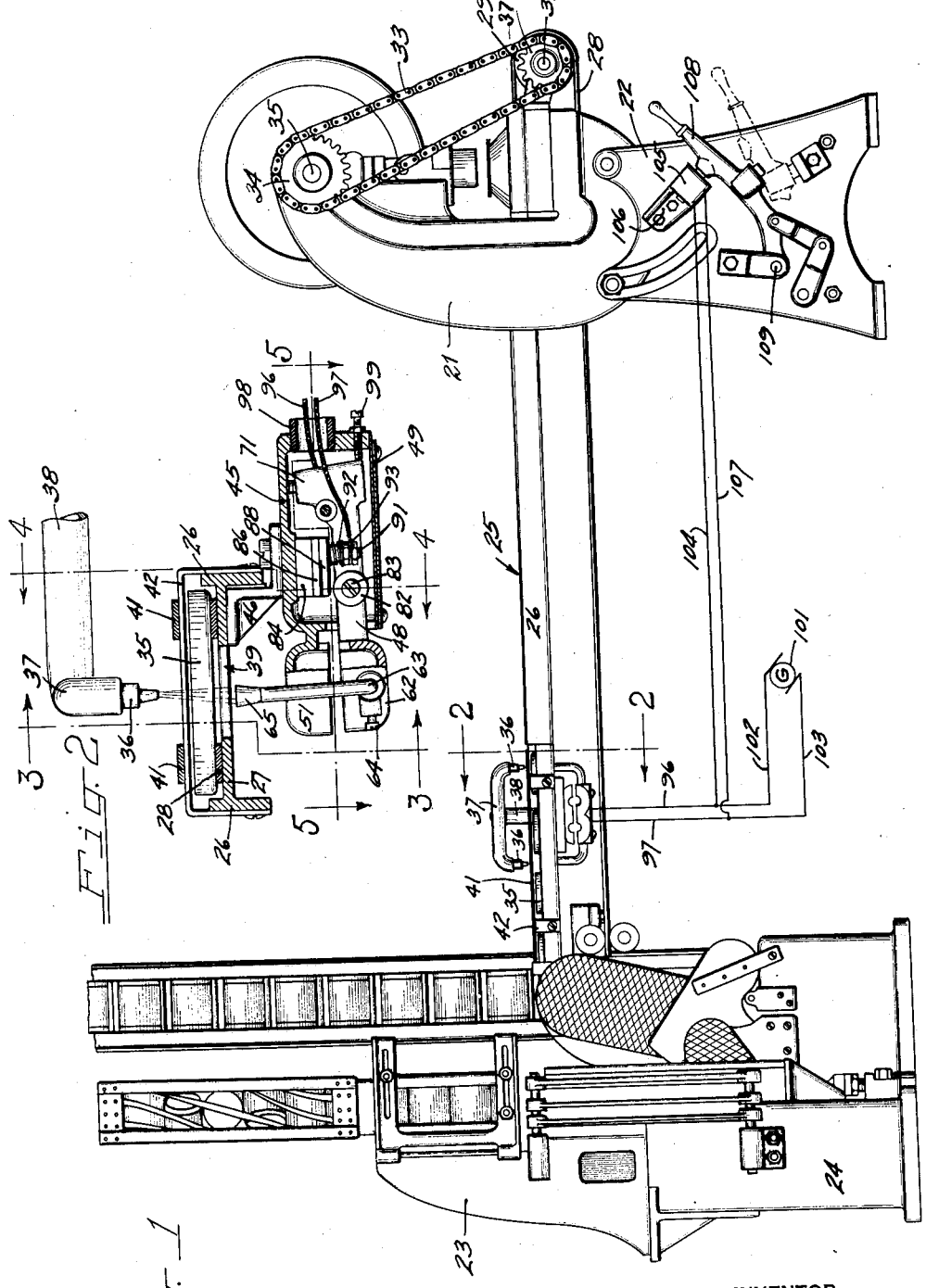

1,839,495

UNITED STATES PATENT OFFICE

HORACE J. PAYNTER, OF MAPLEWOOD, NEW JERSEY, ASSIGNOR TO AMERICAN CAN COMPANY, OF NEW YORK, N. Y., A CORPORATION OF NEW JERSEY

ELECTRICAL SWITCH FOR LINE CONTROL OF CAN MACHINERY

Application filed September 27, 1930. Serial No. 484,923.

The present invention relates to a line control for can machinery and the like, and has particular reference to an electrical switch operated by runway conditions in the line to control the machine feeding into the runway.

The pricipal object of the invention is the provision of an electrical, fully automatic control adapted for use in a runway leading from a machine producing can parts to stop the operations of the machine upon crowding or abnormal movement of the can parts in the runway.

The invention contemplates the use of an electrical switch associated with a conveyor which removes can parts from an operating machine, the switch being actuated by an air blast projected across the path of travel of the can parts in the runway and being affected by feeding conditions of the can parts whereby operation of the machine is controlled by such conditions.

An important object of the invention is the provision of an apparatus for controlling the operation of a machine discharging can parts into a conveyor, the can parts moving under a plurality of air blasts projected across the conveyor and onto an electrical switch. These can parts, by their relative positions in the runway, affect the amount of air passing into the switch and thereby determine the switch positions, which in turn control the operation of the machine.

Numerous other objects of the invention will be apparent as it is better understood from the following description, which, taken in connection with the accompanying drawings, discloses a preferred embodiment thereof.

Referring to the drawings:

Figure 1 is a schematic view illustrating two machines connected with a runway conveyor to which is applied an improved electrical switch and control illustrating a preferred embodiment of the present invention;

Fig. 2 is an enlarged sectional view of the electrical switch control and runway taken substantially along the line 2—2 in Fig. 1;

Fig. 3 is a part elevation, part sectional view of the devices illustrated in Fig. 2, this view being taken substantially along the line 3—3 in that figure;

Fig. 4 is a sectional view of the same, being taken along the line 4—4 in Fig. 2;

Fig. 5 is a plan sectional view taken along the line 5—5 of Fig. 2; and

Fig. 6 is a transverse sectional view taken along the broken line 6—6 in Fig. 5.

In order to illustrate the invention, there is disclosed on the right-hand side of Fig. 1, a machine such as a press for stamping out can parts. A second machine, such as a can heading machine, is illustrated on the left-hand side of that figure and these two machines are connected by a runway through which moves a conveyor for transferring articles formed in the press to the header. By way of indicating mechanism for starting and stopping the press, an operating handle of the press is shown, which may be held in operating position while the machine is running, by an electro magnet which is connected in an electrical circuit diagrammatically illustrated in Fig. 1.

The conveyor normally moves the articles along the runway in spaced position and under a pair of air nozzles which project blasts of air downwardly through two end pockets of a movable part of an electrical switch. As long as one or both of the air blasts are being projected against the movable part of the switch, the latter is in its open position.

As soon as both air blasts are blocked off, by the can parts becoming jammed or crowded in the runway so that the air from the nozzles does not reach the movable part of the switch, this switch part moves and establishes a shunt circuit cutting out or deenergizes the electro magnet of the press and allowing the operating handle to fall into non-operating position. This may stop full operation of the press or of any part thereof as desired. The simultaneous blocking of both air jets only takes place when abnormal conditions in the runway cause the can parts to abut one another in close order. These conditions are ordinarily caused by a jamming of can parts in the header or other machine receiving the can parts from the conveyor.

The forming press, illustrated and designated by the numeral 21, (Fig. 1) is, as in the usual manner, mounted on legs 22 and a second machine, receiving the can parts, may be a can header 23 which is mounted on a suitable base 24. The two machines 21 and 23 are connected by a runway 25, embodying a channel member with side rails 26 (see also Fig. 2) and a horizontal floor section 27. The upper runs of two narrow conveyor belts 28 are adapted to move in spaced relation along the channel member and over the floor 27 thereof, these belts operating in any usual and preferred manner as over pulleys carried by the two machines.

A pulley 29 is illustrated in connection with the press 21, which carries the belts 28 at one end of the conveyor, this pulley being rotated by connection with a shaft 31 which carries a sprocket 32 over which operates a chain 33 passing over a sprocket 34 secured to a drive shaft 35. The shaft 35 is or may be the drive shaft of the press and is the principal power member for the regular press operations. This shaft, through the described connections, operates the conveyor belts 28 to move the upper runs thereof along the channel or runway and toward the header 23.

Can parts 35 or other suitable articles which may be formed or partially formed by the press 21 are thus carried in a horizontal position on the upper runs of the belts 28, the action of the press being such as to normally place such can parts at spaced intervals on the belts. These can parts remain spaced as they are conveyed along the runway 25 just so long as normal conditions obtain.

As the can parts 35, carried on the runway belts 28 approach the heading machine 23, they pass beneath a pair of spaced air nozzles 36 carried in the ends of a pipe T 37 which is connected, by a pipe 38, to a source of compressed air supply. Compressed air is continually forced through the pipes and through the nozzles 36, the latter projecting the air blasts downwardly in the space between the belts 28 and through openings 39 cut in the floor 27 of the runway.

Top rails 41, (Figs. 1 and 2) are carried by spaced brackets 42, secured to the side rails 26. These rails prevent upward displacement of the can parts 35 from the runway and insure proper movement with the traveling belts 28.

An electrical switch is mounted on the under side of the runway 25 and comprises a switch body 45 (Figs. 2, 3 and 6) carried by a Z-bracket 46 secured to the floor 27 of the runway. The body 45 is formed as a hollow shell or housing which partly encloses a movable switch member 48 and other parts of the switch. The bottom of the shell body is closed by a plate 49 and its forward end is extended and spread into a pair of cup members 51 which are located beneath and in the same vertical plane with the pipe T 37.

The movable member 48, inside of the housing 45, is provided with a pair of arms 55 (Fig. 5) which extend outwardly to positions adjacent the walls of the housing. The end of each arm is pivotally engaged by the reduced end of a screw 56 which is threadedly held in a seat 57 formed in the body wall. A locknut 58 threadedly secured on each of the screws 56 holds the latter in proper position to provide a pivot for the movable switch member.

This member extends forwardly through an opening 61 formed in the body 45 and is enlarged to provide a pair of cup members 62 which correspond in general configuration to the stationary cup members 51. Each cup member 62 carries a pipe 63 (see also Figs. 3, 5 and 6) which extends through the outer wall thereof and is held in fixed position by a screw 64. The upper end of each pipe 63 extends upwardly and is flared outwardly into a funnel shape, as indicated at 65, and each funnel end is in alignment with one of the nozzles 36.

The member 48 adjacent the arms 55 is formed with an enlarged end or boss 71 (Figs. 2, 5 and 6) which is provided with a vertical bore 72 in which is slideably mounted a button 73 normally held outwardly by a spring 74 located within the bore. The opposite end of the spring engages a setscrew 75 threaded in the lower end of the boss 71 and compression on the spring is varied by change of position of the setscrew. The spring 74, acting through the button 73, tends to urge the forward cup end of the member 48, into its upper position illustrated in Figs. 3 and 6 but this tendency is overcome during normal runway conditions by the continuous blast of air issuing from the nozzles 36.

Contact rollers 81 and 82 (Figs. 4, 5 and 6) are carried by the movable switch member 48, being mounted on opposite ends of a screw 83 extending through the body thereof forward of the arms 55. A block 84 of insulating material is connected to the switch body 45 directly above the contact rollers and plates 85 and 86 are held in spaced position against the lower face of the block.

Other plates 87 and 88 are mounted respectively beneath the plates 85 and 86, the plates 85 and 87 being mounted on a screw 89 and the plate 86 and 88 being mounted in a similar manner on a screw 91 (Figs. 2 and 6). The screws 89 and 91 are held in the block 84 and project downwardly below their respective plates and through springs 92 resting on nuts 93, threadedly secured to the screws. This construction provides binding posts for wires 96 and 97 extending through a conduit pipe 98 threadedly engaged in one wall of the switch body.

When the movable member 48 of the switch is held by the spring 74 in the position illustrated in Figs. 3 and 6, the roller 81 is in contact with its plate 87 and the roller 82 is in contact with its plate 88. An electrical circuit is thereupon closed through the switch, and between the terminal ends of the wires 96 and 97. Such a circuit includes the binding posts or screws 89 and 91, the contact plates 87 and 88, the rollers 81 and 82, and the movable switch member.

Contact plates 85 and 86 are undercut, as illustrated in Figs. 4 and 6, to permit slight yielding movement of the plates 87 and 88 relative to the plates 85 and 86 as the rollers 81 and 82 are brought into switch closing position. The springs 92 on these screws yield to permit this action.

As long as the blast of air is permitted to discharge from either one or both nozzles 36, through the openings 39 therebeneath and into one or both pipes 63 carried by the movable member 48, the forward cup end of the latter is held down, the switch member moving to such position on its pivots and against the action of the spring 74 (Fig. 2). A stop pin 99 threadedly secured in the end wall of the housing 45 forms a limiting stop for this movement, the boss 71 of the member 48 striking against the end of this pin at such a time. The contact rollers 81 and 82 are thus separated from their respective contact plates 87 and 88 and the electrical circuit is broken in the switch.

During normal conveyor conditions in the runway with the moving of the can parts 35 on the belts 28 and in spaced relation, (Fig. 1) at least one of the air blasts issuing from its nozzles 36 strikes the switch part by passing into one of the pipes 63. The amount of pressure on the switch part exerted by a single blast of air is sufficient to hold the switch in its open position and as long as the spaced relation of can parts is maintained one air stream is blocked only when the other air stream is unobstructed.

In the event that the normal runway conditions are interfered with, such as by a jamming of the can parts 35 passing into the header 23, the can parts on the conveyor belts 28 crowd into close abutted position with each other, as illustrated in Figs. 3 and 4, the belts 28 moving idly therebeneath at such a time.

When this condition is brought about air from both of the nozzles 36 is simultaneously blocked by the can parts 35 and no air enters into either of the pipes 63. The spring 74 thereupon acts to bring the switch parts into closed position permitting a flow of electrical current through the switch.

The cup shaped form of the members 51 and 62 provide chambers into which the air entering through the pipes 63 pass and by an accumulation of air within these chambers, which escapes from the crack therebetween, a more sensitive action of the movable member 48 is obtained. Operation of the switch, therefore, is not depending solely upon the pressure of the air as it strikes the pipes 63 but also upon the accumulation of air within the chambers formed interiorly of the members 51 and 62.

Reference should now be had to Fig. 1 and the wiring diagram which discloses a source of electrical energy indicated as a generator 101 feeding current along wires 102 and 103, the wire 102 being connected with a wire 104 leading into the winding of an electro magnet 105, carried in a bracket 106, secured to one of the legs 22 of the press 21. The wire 103 is connected in a similar manner to a wire 107 which connects with the opposite end of the winding of the electro magnet 105.

The wire 102 is also connected with the wire 96 and the wire 103 is connected with the wire 97, the wires 96 and 97 leading into the electrical switch. As long as normal conditions obtain in the runway and the electrical switch is in open position, current flows from the generator 101, through the wires 102 and 104, through the winding of the electro magnet 105 and thence return by way of the wires 107 and 103 to the generator. The electro magnet 105 is thus energized and its core holds a handle lever 108 in the position shown in full lines in Fig. 1. The lever 108 is pivoted at 109 to the leg of the press 21. When in this position the handle lever holds the press parts in operating position.

As soon as abnormal runway conditions are formed and the electrical switch connected therewith is closed a shunt circuit is provided and passage of electrical energy takes place from the generator 101, through the wires 102 and 96 to the binding post screw 91 and through the switch mechanism previously described, back to the binding post screw 89 and out by way of the wires 97 and 103 to the opposite side of the generator. Establishment of this circuit cuts out the circuit passing into the electro magnet by reason of the fact that the shunt circuit offers a path of low resistance as compared with the high resistance in the windings of the electro magnet 105.

The electro magnet is, therefore, deenergized. The control handle lever 108 then falls of its own weight into non-operating position as indicated in the dotted lines in Fig. 1. The press 21 or certain parts thereof stop operating and feeding of can parts 35 into the runway 25 ceases. The press 21 will then remain in this non-operating condition until the jammed condition of the runway is relieved and the press handle is manually returned into operating position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can line control, the combination of a machine for performing a can making operation upon a can part, a conveyor for automatically removing the can parts from said machine, an electrical switch located adjacent said conveyor and associated with the operation of said machine, and air means controlling the operation of said machine through said switch in accordance with the feeding conditions of the can parts in said conveyor.

2. In a can line control, the combination of a machine for performing a can making operation upon a can part, a conveyor for automatically removing the can parts from said machine, and an electrical switch located adjacent said conveyor and associated with the operation of said machine and held in machine operating position by a blast of air projected across the path of travel of said can parts in said conveyor and movable into machine stopping position by an accumulation of can parts in said conveyor.

3. In a line of can machinery, the combination of a plurality of machines adapted to successively perform a can making operation upon can parts, a conveyor for automatically transferring the can parts from one machine to the next in line, an electrical switch associated with the operation of the machine feeding into said conveyor and held in machine operating position by a blast of air projected across the path of travel of said can parts in said conveyor, and means for moving said switch into a position to stop said feeding machine operation when a jam in the machine being fed by said conveyor causes an accumulation of can parts in the conveyor sufficient to block the passage of said air blast into said switch.

4. An electrical switch for a conveyor runway, comprising in combination, a switch body carried by the runway, a movable contact member pivoted on said body and carrying switch closing elements for completing an electrical circuit when in one position, a plurality of air blast nozzles positioned above the path of travel of can parts carried in the runway by said conveyor and adapted to project blasts of air against the said movable switch member in sufficient quantities during normal feeding conditions of the can parts in said conveyor to hold the said switch member in a switch position, and means operating when abnormal accumulation of can parts in said conveyor blocks the air reaching said switch member, for moving said member into the other switch position.

5. In a can line control, the combination of mechanism for operating upon a can part, means for feeding can parts, an electric control switch associated with said means and air means controlling the operation of said switch in accordance with the feeding conditions of can parts in said feeding means.

HORACE J. PAYNTER.